United States Patent [19]
Kim

[11] Patent Number: 5,828,698
[45] Date of Patent: Oct. 27, 1998

[54] DATA FLOW MANAGEMENT METHOD FOR CDPD DEMODULATOR OPERATING WITHOUT CDPD CLOCK

[75] Inventor: In-Kyung Kim, N. Potomac, Md.

[73] Assignee: Hughes Electronics, Los Angeles, Calif.

[21] Appl. No.: 397,664

[22] Filed: Feb. 28, 1995

[51] Int. Cl.$^6$ .................................................. H04L 25/36
[52] U.S. Cl. ........................ 375/223; 375/324; 375/340; 375/372; 341/61
[58] Field of Search .................................... 375/222, 223, 375/322, 324, 372, 340, 262, 371; 341/61; 370/545, 906, 358

[56] References Cited

U.S. PATENT DOCUMENTS

| | | | |
|---|---|---|---|
| 4,825,448 | 4/1989 | Critchlow et al. | 375/222 |
| 5,461,426 | 10/1995 | Limberg et al. | 348/475 |
| 5,486,784 | 1/1996 | Eriksson | 375/372 |
| 5,493,589 | 2/1996 | Ibenthal | 375/372 |

*Primary Examiner*—Don N. Vo
*Attorney, Agent, or Firm*—John T. Whelan; Wanda Denson-Low

[57] ABSTRACT

An efficient and power-saving method of converting serial in-phase (I) and quadrature-phase (Q) symbols at the IS-54 standard symbol rate, to time-aligned IQ pairs at the CDPD standard symbol rate. A FIFO buffer stores the serial in-phase (I) and quadrature-phase (Q) symbols at the IS-54 standard symbol rate. A DSP performs CDPD demodulation by reading time-aligned IQ pairs directly from the FIFO buffer, even though the FIFO buffer contains serial in-phase (I) and quadrature-phase (Q) symbols at the IS-54 standard symbol rate. This is accomplished by performing a rate conversion method between the DSP pointer and the FIFO buffer. The rate conversion combines, symbol rate conversion, sample timing alignment, and sign corrections in one calculation, resulting in an efficient method of generating the desired time-aligned IQ pairs at the CDPD symbol rate. A look-up table is used for several of the variables in the rate conversion calculation. The present invention further provides a method of mimicking the appropriate CDPD sample clock timing by adjusting the total number of FIFO samples to be read during steady state demodulation.

1 Claim, 6 Drawing Sheets

DATA FLOW MANAGEMENT METHOD FOR CDPD DEMODULATOR OPERATING WITHOUT CDPD CLOCK

BACKGROUND OF THE INVENTION

Existing cellular network systems have enjoyed great popularity in recent years. At various times, the channels that carry the voice communications of the cellular system may be idle (i.e., no signal transmission over the channel at a particular time). These unused or idle voice channels may be utilized for other communication such as data communication. In particular, an overlay system network utilizing unused or idle voice channels for digital data communication is desirable. Cellular Digital Packet Data (CDPD) is such an overlay system which provides mobile datagram service utilizing existing cellular telephone networks. The CDPD system allows digital data transmission over idle channels of an already existing cellular system.

A consortium of cellular communication carriers prepared and released in 1993 a specification entitled "Cellular Digital Packet Data System Specification." The specification defines a protocol to be used by the industry when transmitting and receiving CDPD data messages over an existing cellular communication system. The protocol specifies that CDPD shall be transmitted at a symbol rate that is an integer multiple of 19.2 KHz. The protocol also specifies the format of the CDPD messages. More particularly, CDPD messages are transmitted in bursts, each having a preamble formed by a dotting sequence of 38 bits followed by a synchronization pattern of 22 bits. Following the preamble is the data sequence comprised of n multiples of 385 bits of data.

The CDPD overlay system utilizes the facilities of the existing cellular radiotelephone system to transmit data. In particular, a plurality of remote subscriber units, for example, cellular telephones, communicate with other mobile remote subscriber units or with the public switched telephone network (PSTN) through base stations. Remote subscriber units may also be stationary, for example mounted in an apartment complex. The data communication from the remote subscriber units to the base stations is wireless.

In order to allow cellular systems to transmit CDPD, existing voice-based base stations and cellular units must be modified to transmit and receive data in the CDPD protocol. In order to take full advantage of the existing cellular system, the CDPD transmissions should utilize as much of existing cellular hardware as possible. There are several obstacles to this objective. For example, digital voice TDMA (time-division multiple access) transmissions in existing cellular systems use a system clock operating at 24.3 KHz (or an integer multiple of 24.3 KHz). However, CDPD protocols transmit data at a rate of 19.2 KHz. Thus, a base station capable of transmitting and receiving digital voice and CDPD data must be able to process digital voice symbols at the TDMA rate of 24.3 KHz, along with CDPD data symbols at the CDPD rate of 19.2 KHz. This can involve complicated and elaborate calculations and translations requiring costly processing hardware.

Digital signal processors (DSP) are critical components of the demodulators/modulators that transmit and receive signals in cellular base stations. The DSPs that transmit and receive digital voice at the 24.3 KHz TDMA rate are powerful but expensive. Considerably less expensive and powerful are the DSPs that process analog voice. Thus, in designing the modulators and demodulators of a cellular base station, wherein the base station is capable of processing FM analog voice, TDMA-modulated digital voice and GMSK (gaussian minimum shift-keying) modulated CDPD data, it would be beneficial to design processing procedures that are capable of being implemented on the inexpensive and less powerful DSPs already found in most existing base stations.

SUMMARY OF THE INVENTION

The present invention provides an efficient and power-saving method of converting serial in-phase (I) and quadrature-phase (Q) symbols at the IS-54 standard symbol rate, to time-aligned IQ pairs at the CDPD standard symbol rate. The present invention provides a FIFO buffer for storing the serial in-phase (I) and quadrature-phase (Q) symbols at the IS-54 standard symbol rate. A DSP performs CDPD demodulation by reading time-aligned IQ pairs directly from the FIFO buffer, even though the FIFO buffer contains serial in-phase (I) and quadrature-phase (Q) symbols at the IS-54 standard symbol rate. This is accomplished by performing a rate conversion method between the DSP pointer and the FIFO buffer. By carrying out the rate conversion method of the present invention, symbol rate conversion, sample timing alignment, and sign corrections are all combined together, resulting in an efficient method of generating the desired time-aligned IQ pairs at the CDPD symbol rate. Efficiency is further achieved with the present invention by incorporating a unique table construction method that saves considerable DSP processing time. As a result, the conversion protocol of the present invention is capable of being implemented on a less expensive and less powerful DSP, such as the TI C51 family of DSPs. By allowing the DSP pointer to read CDPD rate samples directly from the FIFO buffer (which was loaded at the IS-54 sampling rate), there is no need to provide a separate CDPD buffer for storing the time-aligned IQ pair, thereby eliminating the need for the slower external memory and reducing processing overhead.

In general, above-described rate conversion method of the present invention converts serial I symbols and Q symbols at a first sampling rate to time-aligned IQ pairs at a second sampling rate. The steps of the method include determining a first serial I symbol, determining a second serial I symbol, determining an I component of the IQ pair at the second sampling rate by interpolating between the first serial I symbol and the second serial I symbol, determining a first serial Q symbol, determining a second serial Q symbol, determining a Q component of the IQ pair at the second sampling rate by interpolating between the first serial Q symbol and the second serial Q symbol, the I component being time-aligned with the Q component to form the time-aligned IQ pair at the second sampling rate. Preferably, the first sampling rate is an integer multiple of 24.3 KHz, and the second sampling rate is an integer multiple of 19.2 KHz.

The method of the present invention calculates the above-described I component (sample $Y_I(n)$) and Q component (sample $Y_Q(n)$) according to the following equation, $$Y_{I,Q}(n) = [\delta'_n Z(k_n) - \delta_n Z(k_n+2)]c_{k_n} \quad (1)$$

where the sign correction sequence $\{c_{kn}\}$ is defined as follows. For the input samples $\{Z(k)\}$ with sign inversion sequence $S_1$, $\{c_{kn}\}$ is given as $$c_{k_n} = \begin{cases} +1 \text{ if } int\ (k_n/2) \text{ is even} \\ -1 \text{ if } int\ (k_n/2) \text{ is odd} \end{cases} \quad (2)$$

For the input samples $\{Z(k)\}$ with sign inversion sequence $S_2$, $\{c_{k_n}\}$ is given as follows. For $Y_I(n)$ computations, $$c_{k_n} = \begin{cases} +1 \text{ if } int\ (k_n/2) \text{ is even} \\ -1 \text{ if } int\ (k_n/2) \text{ is odd} \end{cases} \quad (3)$$

Similarly, for $Y_Q(n)$ computations, $$c_{k_n} = \begin{cases} -1 \text{ if } int\ (k_n/2) \text{ is even} \\ +1 \text{ if } int\ (k_n/2) \text{ is odd} \end{cases} \quad (4)$$

Even after the serial I and Q symbols have been rate-converted to time-aligned CDPD IQ pairs, there is still the problem of the DSP properly sampling the CDPD IQ pairs without the benefit of a CDPD rate clock. The present invention keeps track of the appropriate CDPD sample clock timing by providing a method of ensuring that the DSP reads the right number of samples from the FIFO buffer. Thus, the method of the present invention is further directed toward achieving virtual real time processing independent of burst arrival time. This means that demodulation of each CDPD data message should be timed to finish at approximately the end of the data message. At the end of an RS block demodulation, the total number of FIFO samples which the DSP read dictates the approximate time elapsed from the microslot marker. Thus, virtual real time processing independent of burst arrival time can be achieved by adjusting the total number of FIFO samples to be read during steady state demodulation. The FIFO reading strategy of the present invention proceeds according to the following modification of the number of FIFO samples reads for the first block, $$118 + 60 - (84 - t_{acq}) \times 10 = t_{acq} \times 10 - 662$$

In the above formula, $t_{acq}$ is the burst arrival time estimation in bits, 10 is approximation of $8 \times 81/64 = 10.125$.

The invention itself, together with further objects and attendant advantages, will best be understood by reference to the following detailed description, taken in conjunction with the accompanying drawings.

DETAILED DESCRIPTION OF THE DRAWINGS

Figure 1:
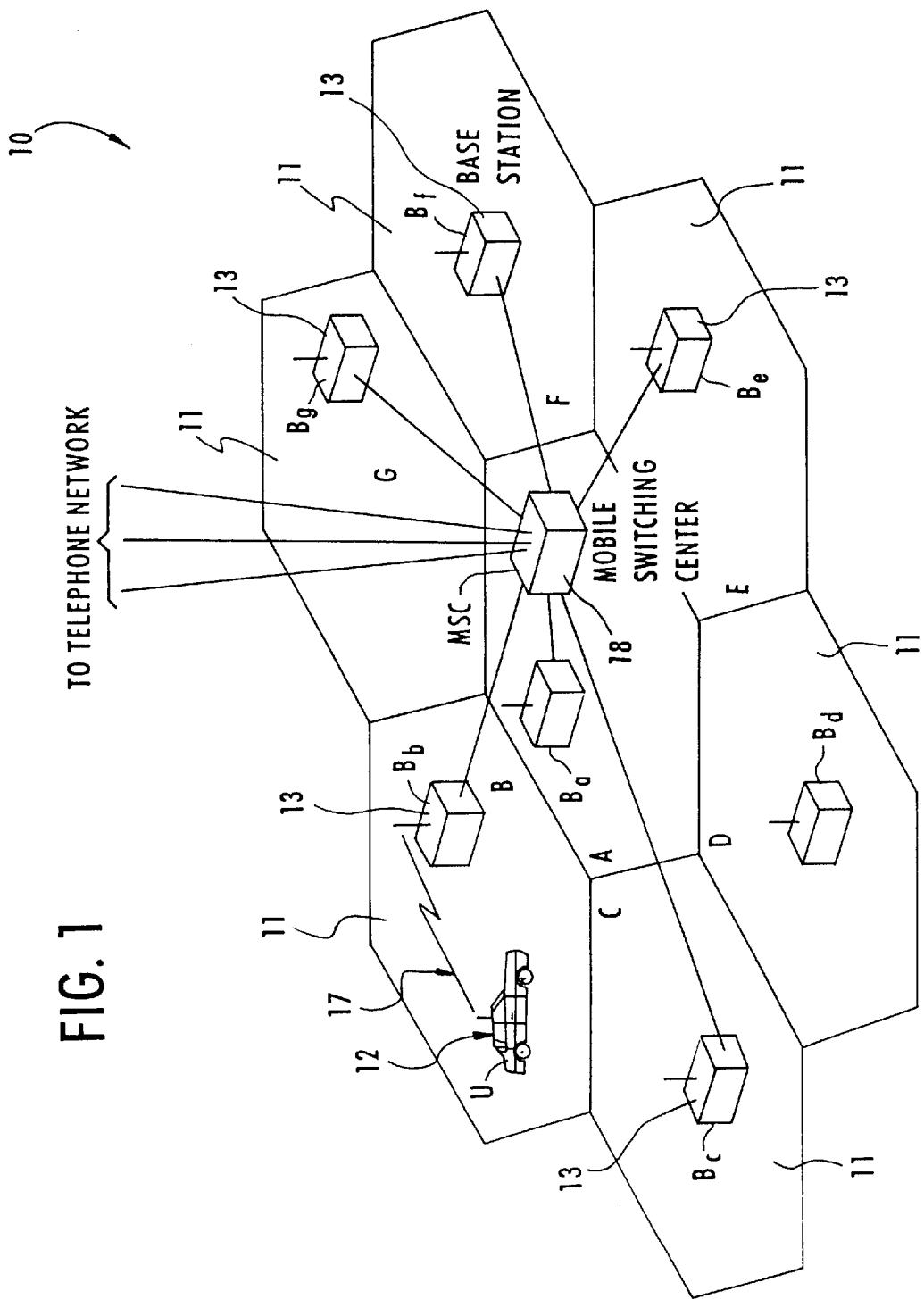
FIG. 1 is a general block diagram of a cellular radio communication system.

FIG. 1 is a general block diagram of a cellular radio communication system 10 incorporating a CDPD overlay. The following is a simplified description of the system 10, intended for illustrative purposes only. The existing cellular communication system 10 includes a plurality of remote subscriber units 12 (only one of which is illustrated). Geographical areas are divided into cells 11, and within each cell 11 is a base station 13 that transmits and receives signals from the remote subscriber units 12.

The base stations 13 are wire-connected to a mobile switching center 18, and the mobile switching center 18 is wire-connected to a PSTN. The remote subscriber units 12 communicate with other remote subscriber units through base stations 13. The remote subscriber units 12 may be mobile or stationary. The data communication between remote subscriber units 12 and base stations 13 is wireless (i.e., occurs over airlink 17).

Figure 2:
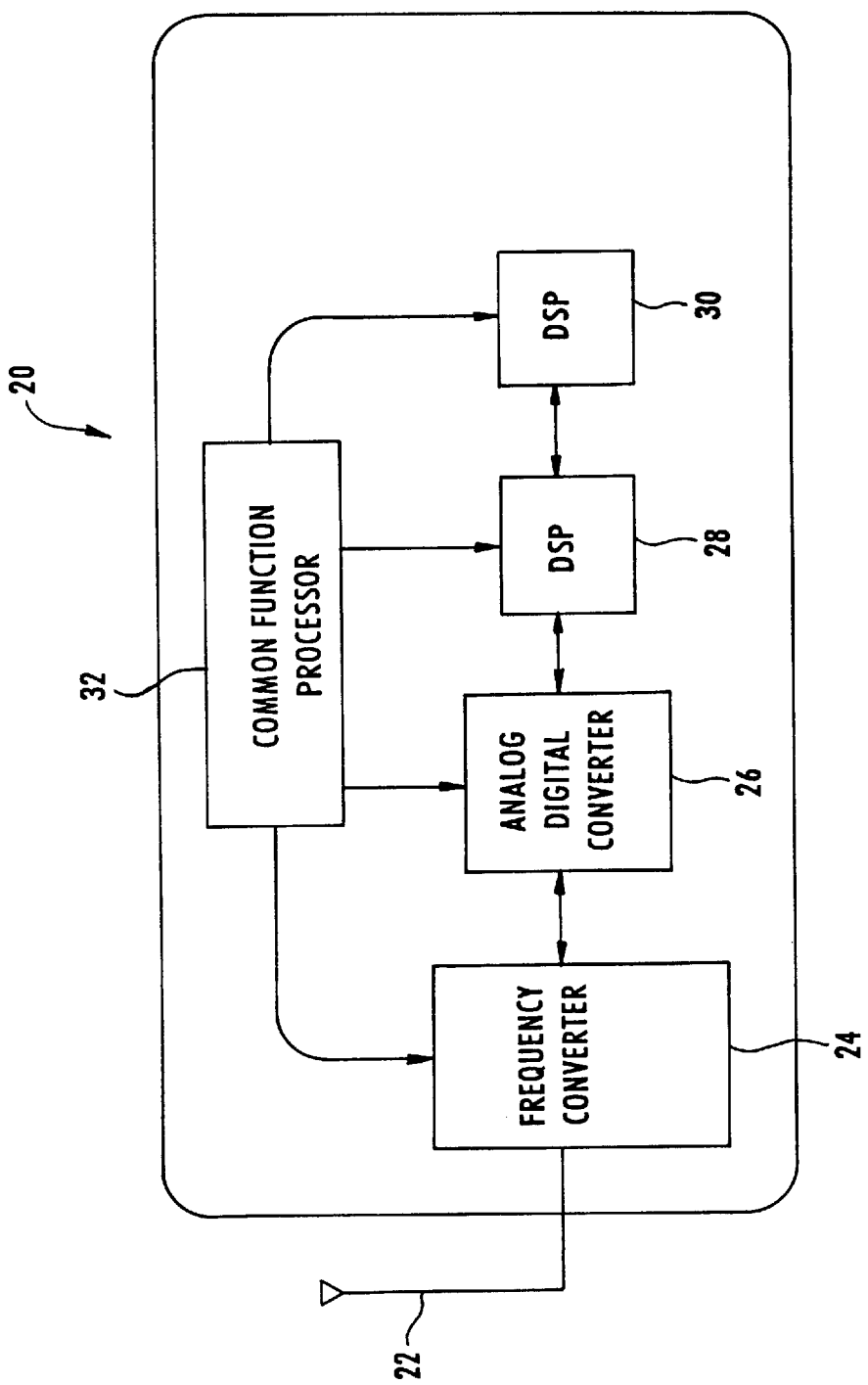
FIG. 2 is a block diagram of a transceiver embodying features of the present invention. The illustrated transceiver is part of the base station shown in FIG. 1.

FIG. 2 is a block diagram of a portion of a transceiver 20 embodying features of the present invention. The transceiver 20 is part of the base station 13 shown in the cellular system 10 shown in FIG. 1. Preferably, the transceiver 20 has sufficient hardware components for processing frequency modulated analog voice, TDMA modulated digital voice, and GMSK modulated CDPD data. The transceiver 20 includes at least one antenna 22, a frequency converter 24, an analog/digital converter 26, several digital signal processors (DSP) 28, 30, and a common function processor 32. The antenna 22 receives the signal transmitted by a remote subscriber unit 12, and transmits signals to the remote subscriber units 12. For received signals, the frequency converter 24 strips away the carrier frequency, and the analog/digital converter 26 converts the resulting signal to baseband. For signals that are to be transmitted, the analog/digital converter 26 and the frequency converter 24 perform the opposite operations, converting the digital bit stream to analog, then converting the analog signal to the required RF frequency for transmission.

The analog/digital converters 26 are coupled to DSPs 28, 30 which perform the bulk of the modulation and demodulation required for transmitted and received signals. In a preferred embodiment, some of the DSPs 30 are model no. 96002 manufactured by Motorola, Inc. These DSPs 30 are powerful but expensive, and particularly suited for performing the complicated and elaborate processing required for TDMA digital voice signals. Other DSPs 28 are less powerful and expensive than the aforementioned DSPs 30, and are particularly suited for the relatively less complicated processing of analog voice signals. Preferably, the DSPs 28 are from the Texas Instruments (TI) C51 family of digital signal processors.

The common function processor 32 performs functions that are common to the frequency converter 24, analog/digital converters 26, and DSPs 28, 30, including for example handshaking, diagnostics, and slot interrupts.

The base station of a conventional voice-based cellular system is designed to process digital voice signals according to the IS-54 standard which designates that the clock rate of the system shall be an integer multiple of 24.3 KHz. However, under the CDPD standards, data is transmitted and received at a clock rate that is an integer multiple of 19.2 KHz.

CDPD data is transmitted in packets of "bi-nary" symbols, wherein each symbol comprises one bit that may be either zero (0) or one (1), and wherein each symbol has a duration $T_b$. In general, the symbols can be "N-nary," wherein each symbol comprises N bits, each of which may be either zero (0) or one (1), and wherein each symbol has a duration $T_s$. Thus, each N-ary symbol has N possible values.

In both TDMA digital voice and CDPD data transmissions, a 4-ary signalling scheme is used. CDPD uses the GMSK phase modulation process to map the 4-ary symbols into 4 different phases representing the actual electrical waveform. Thus, each symbol in the CDPD bitstream is modulated to an in-phase (I) component and a quadrature-phase (Q) component.

The present invention is an efficient and power-saving method of converting modulated IQ pairs of CDPD data, which have been transmitted on IS-54 standard hardware at the IS-54 standard symbol rate, to the CDPD standard symbol rate. A major hurdle which is overcome by the present invention is that the IS-54 standard symbol rate is a non-integer multiple of the CDPD symbol rate. Following the method of the present invention, symbol rate conversion, sample timing alignment, and sign corrections are all combined together, resulting in an efficient method of generating the desired samples at the CDPD symbol rate. Efficiency is further achieved with the present invention by incorporating a unique table construction method that saves considerable DSP processing time. As a result, the conversion protocol of the present invention is capable of being implemented on a less expensive and less powerful DSP, such as the TI C51 family of DSPs.

The present invention provides further advantages by implementing the above described rate conversion without the need for two separate buffers external to the DSP. In the logical derivation of the invention, a FIFO buffer is provided for temporarily storing serial I and Q samples at four times the IS-54 rate. Also, a CDPD buffer is provided for storing the rate-converted, sign converted, and time aligned complex IQ pairs before demodulation. However, in the physical implementation, the "logical" CDPD buffer is eliminated, and the FIFO samples are rate-converted, then feed directly to the DSP for demodulation without temporary storage. This allows the FIFO buffer to be implemented in the DSP's internal memory of approximately 1K. Because internal memory tends to be faster than external memory, overhead processing time is decreased.

The present invention is also a method of providing IQ pairs for demodulation at the CDPD symbol rate without having a CDPD rate clock to provide timing. Typically, the system's hardware provides symbol timing by providing a system clock. If, for example, the system's hardware samples 4 samples per clock pulse, and the clock pulses are provided to the system's DSP, the DSP knows that whenever it receives a clock pulse, one clock period has just elapsed indicating that the DSP has just received 4 samples for processing. However, under the present invention, a CDPD clock is not available in the system hardware. Accordingly, the present invention keeps track of the appropriate CDPD clock timing by providing a method of ensuring that the CDPD DSP reads the right number of samples from the FIFO buffer. The method addresses acquisition and processing delays.

The frequency converter 24 and analog/digital converter 26 shown in FIG. 2 provide I and Q samples serially to the CDPD DSP 28 at 4×24.3 KHz rate. To demodulate properly, the I and Q samples must be made available in pairs at 4×19.2 KHz, which is the CDPD symbol rate. Also, because the I and Q samples are provided serially, the proper sign of each time-aligned IQ pair must also be recovered. Thus, one aspect of the present invention 1) time-aligns the serial I and Q symbols into IQ pairs, 2) converts the time-aligned IQ pairs to the CDPD symbol rate of 4×19.2 KHz, and 3) applies the correct sign to each time-aligned IQ pair.

Figure 3:
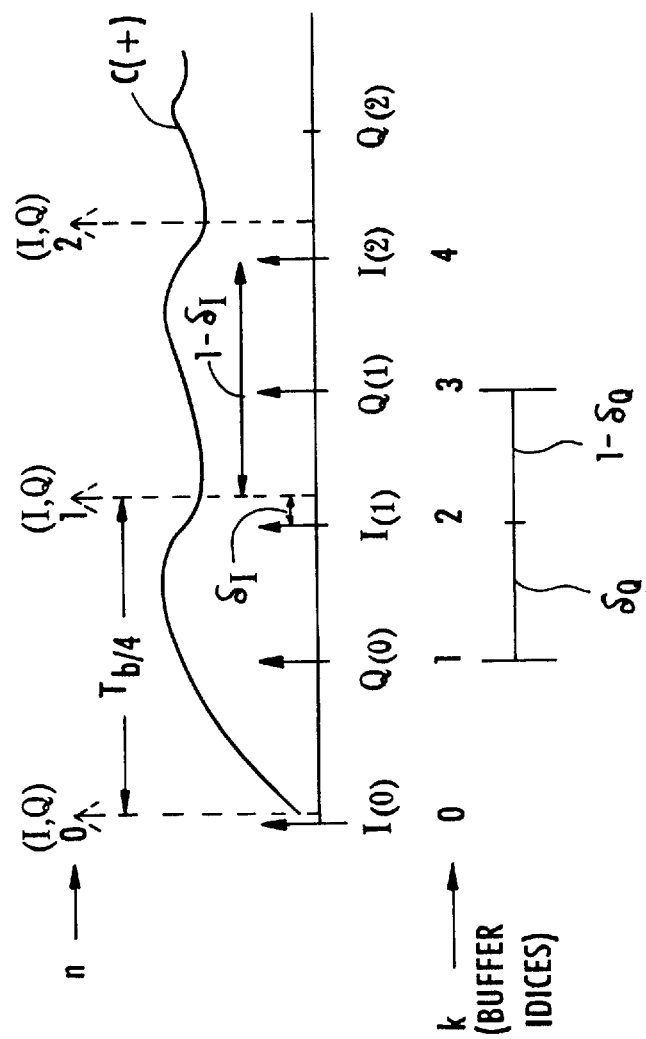
FIG. 3 is a diagram illustrating serial I and Q symbols arriving at an integer multiple of the IS-54 standard symbol rate, along with the desired IQ pairs at an integer multiple of the CDPD standard symbol rate.
Figure 4:
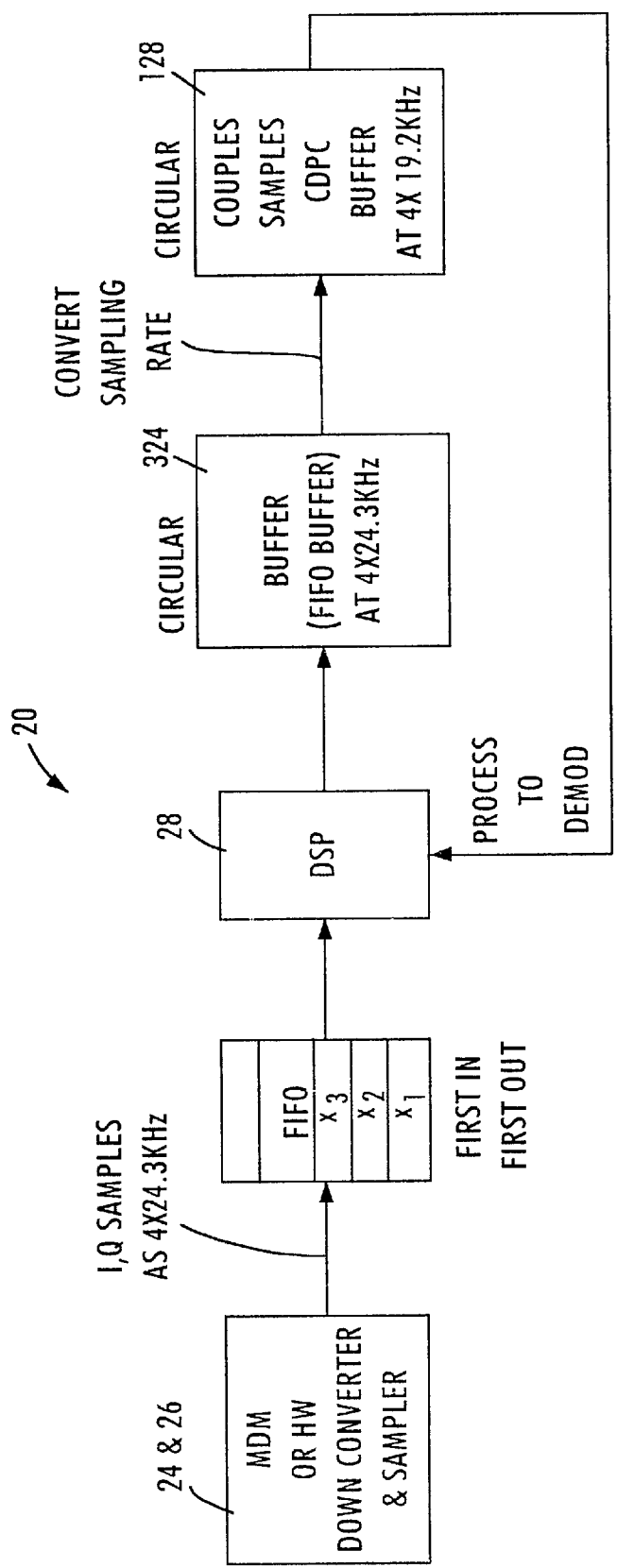
FIG. 4 is a block diagram of a portion of the transceiver shown in FIG. 2 embodying the present invention.

FIG. 3 is a diagram illustrating serial I and Q symbols arriving at an integer multiple of the IS-54 standard symbol rate, along with the desired IQ pairs at an integer multiple of the CDPD standard symbol rate. In general, FIG. 3 is a "logical" representation of the serial I and Q symbols stored sequentially in a FIFO buffer. The serial I and Q symbols are represented by solid-line arrows, and the IQ pairs are represented by broken-line arrows. The indices "k" are numerical representations of the serial I and Q symbols, and the indices "n" are numerical representations of the rate-converted IQ pairs.

The present invention calculates the desired IQ pairs, sample $Y_I(n)$ and or $Y_Q(n)$, according to the following equation, $$Y_{I,Q}(n) = [\delta'_n Z(k_n) - \delta_n Z(k_n+2)] c_{k_n} \quad (5)$$

where the sign correction sequence $\{c_{kn}\}$ is defined as follows>For the input samples $\{Z(k)\}$ with sign inversion sequence $S_1$, $\{C_{kn}\}$ is given as $$c_{k_n} = \begin{cases} +1 \text{ if } int\ (k_n/2) \text{ is even} \\ -1 \text{ if } int\ (k_n/2) \text{ is odd} \end{cases} \quad (6)$$

For the input samples $\{Z(k)\}$ with sign inversion sequence $S_2$, $\{C_{kn}\}$ is given as follows. For $Y_I(n)$ computations, $$c_{k_n} = \begin{cases} +1 \text{ if } int\ (k_n/2) \text{ is even} \\ -1 \text{ if } int\ (k_n/2) \text{ is odd} \end{cases} \quad (7)$$

Similarly, for $Y_Q(in)$ computations, $$c_{k_n} = \begin{cases} -1 \text{ if } int\ (k_n/2) \text{ is even} \\ +1 \text{ if } int\ (k_n/2) \text{ is odd} \end{cases} \quad (8)$$

Because of the periodic nature of the serial I and Q symbols, there are only a finite number of values for certain variables in equation (1). Thus, the possible values of these variables can be calculated for the different indices n, stored in a table, and accessed when needed in calculating the conversion values using equation (1). This significantly reduces the computations required for calculating $Y_I(n)$ and $Y_Q(n)$, while also correcting the signs of the I's and Q's, aligning I and Q timing into pairs, and performing the conversion from a non-integer multiple of the CDPD rate to 4×19.2 KHz, all in the same equation.

The following is a description of how the equations (1) to (4) above were developed. Referring to FIG. 3, the first step is to align the serial I and Q symbols into IQ pairs at the desired CDPD symbol rate. This may be accomplished using a linear interpolation technique in which the two "I" values that are nearest to the desired IQ pair are determined. For n=1, $I_{(1)}$ and $I_{(2)}$ are used to determine the I interpolation, and $Q_{(0)}$ and $Q_{(1)}$ are used to determine the Q interpolation.

The symbol rate conversion algorithm is based on the linear interpolation, which gives sufficient accuracy for implementing the present invention. Of course other interpolators could also be used. $Y_I(n)$ and $Y_Q(n)$ denote the I and Q components of the rate-converted samples which ideally represent I and Q samples taken at $4R_2 (R_2=1/T_2)$ rate (now I and Q samples in pairs are taken at the same time instant to form a complex envelope sample). To get $Y_I(n)$ or $(Y_Q(n))$ from $\{Z(k)\}$ using the linear interpolation method, two samples, $Z(k_n)$ and $Z(k_n+2)$, and two interpolation coefficients, $\delta_n$ and $\delta'_n$, are required. Because the I and Q samples are interlaced in $\{Z(k)\}$, the index $k_n$ corresponding to n is calculated as follows. Let $$k_r = int\left(\frac{81}{64} 2n\right),$$

where int(•) denotes integer part.
For even $k_r$, $$k_n = \begin{cases} k_r & \text{for } Y_I(n) \text{ computation} \\ k_r - 1 & \text{for } Y_Q(n) \text{ computation} \end{cases} \quad (9)$$

For odd $k_r$, $$k_n = \begin{cases} k_r - 1 & \text{for } Y_I(n) \text{ computation} \\ k_r & \text{for } Y_Q(n) \text{ computation} \end{cases} \quad (10)$$

The interpolation coefficients (without sign corrections) are given by $$\delta_n = \begin{cases} frac\left(\frac{81}{64} n\right) & \text{for } Y_I(n) \text{ computation} \\ frac\left(\frac{81}{64} n - 0.5\right) & \text{for } Y_Q(n) \text{ computation} \end{cases} \quad (11)$$

$$\delta'_n = 1 - \delta n$$

where frac(•) denotes fractional part.

The "k" indices that represent "I" FIFO values will always be an even number because of the "2n" value. Similarly, the "k" indices that represent "Q" FIFO values will always be an odd number.

Thus, the interpolation can be accomplished by the following equation, $$Y_{I,Q}(n) = [\delta'_n Z(k_n) - \delta_n Z(k_n+2)] c_{k_n} \quad (12)$$

As previously noted, the "logical" FIFO buffer stores serial I and Q symbols sequentially from the frequency converter 24 and analog/digital converter 26 (shown in FIG. 2). The "k" indices representing "I" symbols will be even numbers, and the "k" indices that represent "Q" symbols will be odd numbers. Thus, $$k_n = [(81/64) \times 2n]$$

Accordingly, if the index $k_n$ is even, the nearest symbol is "I", and, if the index $k_n$ is odd, the nearest sample is "Q". For "I" interpolations where $k_n$ is odd, the nearest buffer symbol to the interpolation point is a "Q" symbol, and therefore the equation moves back the get the closest "I" symbol. For "Q" interpolations where $k_n$ is even, the nearest buffer symbol to the interpolation point is an "I" symbol, and therefore the equation moves back the get the closest "Q" symbol.

The weighing factors, or interpolation coefficients, move the serial I and Q symbols by $T_b/8$ to align them with the desired IQ pairs at the CDPD symbol rate. In this case, the FIFO buffer that stores the serial I and Q symbols can be a so-called "circular" buffer because the calculations described herein will repeat with the following relationship, $$kn = (81/64) \times 2n$$

$$64kn = 162n$$

The above-described equations, however, do not take into account sign correction. As previously described, the IS-54 symbol rate $R_1$ is 24.3 KHz, and the CDPD symbol rate $R_2$ is 19.2 KHz. The frequency converter 24 and analog/digital converter 26 (shown in FIG. 2) provide 8 real samples per $T_1 = 1/R_1$ using IF (intermediate frequency) sampling techniques and feed the samples to the DSP 28. These 8 equally spaced samples represent 4 "I" and "Q" components sampled at different time instants with a particular sign inversion pattern. The IF sampled sequence can be represented as follows, $$Z(k) = \begin{cases} s_k I(T_s k) & \text{if } k = \text{even} \\ s_k Q(T_s k) & \text{otherwise} \end{cases}$$

where $T_S = \frac{1}{8}T_1$, and $\{s_k\}$ is one of the following two patterns, depending on the frequency plan of the frequency converter 24 (shown in FIG. 2) and sampling rate.

$$S_1 = \{+1+1-1-1+1+1-1-1 \ldots\}$$

or $$S_1 = \{+1-1-1+1+1-1-1+1 \ldots\}$$

In observing the above sign patterns, it can be seen that every other "I" has a sign flip, and every other "Q" has a sign flip. Thus, the sign of the interpolated IQ pairs must be modified to account for these sign flips. Thus, the final equation is $$Y_{I,Q}(n) = [\delta'_n Z(k_n) - \delta_n Z(k_n+2)] c_{k_n} \quad (13)$$

Because of the periodic nature of the interpolated IQ pairs, the IQ pattern repeats itself with proper sign alignment after 162 complex (324 real) FIFO buffer contents. Thus, the FIFO buffer size can be limited to 162 complex or 324 real.

The computational requirements can be even further reduced by taking advantage of the periodic nature of some of the variables in the above equations. By calculating all of the possible values of these coefficients and storing the indices $k_n$ in tables for each n, all the logic and most of the computation in equations (X) can be avoided. Therefore, a significant amount of DSP processing power can be saved. Thus, following the present invention, the $Y_{I,Q}(n)$ computation is accomplished for each "n" by (1) retrieving the interpolation coefficients, or weighing factors, along with the "k" indices from a table (n serves as address or index for the tables), and (2) plugging the retrieved variables into equation (1).

Table sizes can be determined in the following manner. In the disclosed example, the symbol clock ratio $R = 24300/19200 = 81/64$. This means that 81 samples at the IS-54 rate give exactly 64 samples at CDPD rate. Ignoring sign inversions, the symbol conversion process is periodic in 81 IS-54 rate samples (or 64 CDPD rate samples). The sign inversion sequences $S_1$ and $S_2$ have period 4. If we have computed the first 64 CDPD pairs using the first 64 coefficient pairs, where n=0, 1, ..., 63, then the next 64 coefficient pairs are just the negatives of the first 64 coefficient pairs, where n=0, 1, ..., 63. Therefore, the whole symbol rate conversion process is periodic in 128 CDPD rate samples. The table size for each coefficient (for each I and Q) is 128. Thus, the transceiver 20 must maintain CDPD sample counter modulo 128 to read the coefficient tables and the $k_n$ values.

The following Fortran routine generates the coefficient tables for $S_1$ sequence, where coeI(n,0) and coeI(n,1) represent $b'_n$ and $b_n$ for $Y_I(n)$ computations, and coeQ(n,0) and coeQ(n,1) represent $b'_n$ for $Y_Q(n)$ computations.

```
r1 = 81./64.
do n = 0,63
    indxI=int(r1*n)
    indxQ=int(r1*n- x 0.5)
    delI=frac(r1*n)
    delQ=frac(r1*n-0.5)
    delI_p=1-delI
    delQ_p=1-delQ
    if (n.eq.0) then
        indxQ=-1
        delQ=0.5
    endif
    if (mod(indxI,2).eq.0) then
        coeI(n,0) =delI_p
        coeI(n,1) =-delI
    else
        coeI(n,0) =-delI_p
        coeI(n,1) =delI
    endif
    if (mod(indxQ,2).eq.0) then
        coeQ(n,0) =delQ_p
        coeQ(n,1) =-delQ
    else
        coeQ(n,0) =-delQ_p
        coeQ(n,1) =delQ
    endif
enddo
do n=0,63
    coeI(n+64,0) =-coeI(n,0)
    coeI(n+64,1) =-coeI(n,1)
    coeQ(n+64,0) =-coeQ(n,0)
    coeQ(n+64,1) =-coeQ(n,1)
enddo
```

The following Fortran routine generates the coefficient tables for $S_2$ sequence.

```
r1 = 81./64
do n = 0,63
    indxI=int(r1*n)
    indxQ=int(r1*n- x 0.5)
    delI=frac(r1*n)
    delQ=frac(r1*n-0.5)
    delI_p=1-delI
    delI_p=1-delQ
    if (n.eq.0)then
        indxQ=-1
        delQ=0.5
    endif
    if (mod(indxI,2).eq.0) then
        coeI(n,0) =delI_p
        coeI(n,1) =-delI
    else
        coeI(n,0) =-delI_p
        coeI(n,1) =delI
    endif
    if (mod(indxQ,2).eq.0) then
        coeQ(n,0) =delQ_p
        coeQ(n,1) =-delQ
    else
        coeQ(n,0) =delQ_p
        coeQ(n,1) =-delQ
    endif
enddo
do n=0,63
    coeI(n+64,0) =-coeI(n,0)
    coeI(n+64,1) =-coeI(n,1)
    coeQ(n+64,0) =-coeQ(n,0)
    coeQ(n+64,1) =-coeQ(n,1)
enddo
```

The following Fortran routine generates the table for indices $k_n$, where indexI represents $k_n$ for $Y_I(n)$ computations and indexQ represents $k_n$ for $Y_Q(n)$ computations.

```
r1=81./64
do n=0,127
    indx=int(r1*n*2)
    if (mod(indx,2).eq.0) then
        indxI=indx
        indxQ=indx-1
    else
        indxI=indx-1
        indxQ=indx
    endif
    if (indxQ.eq.-1) then
        indxQ=81*2*2-1
    endif
    indexI(n) =indxI
    indexQ(n) =indxQ
enddo
```

The above-described interpolation schemes contemplate the use of a "logical" CDPD buffer for storing CDPD IQ pairs at the CDPD symbol rate before providing the CDPD IQ pairs to the DSP for demodulation. However, in the actual implementation, the "logical" CDPD buffer is eliminated, and a "virtual" CDPD pointer in the DSP accepts the rate-converted CDPD IQ pairs directly from the FIFO buffer. The interpolation method of the present invention allows the DSP to treat the FIFO buffer as if it is providing IQ pairs at the CDPD rate when in fact it is providing serial I and Q symbols at the IS-54 standard symbol rate. For the minimum sized buffer configuration, the virtual CDPD sample pointer should increment modulo 128 complex samples and the FIFO buffer should be managed as 324 real circular buffer.

Even after the serial I and Q symbols have been rate-converted to CDPD IQ pairs, there is still a need to have the DSP properly sample the CDPD IQ pairs without the benefit of a CDPD rate clock. The present invention keeps track of the appropriate CDPD sample clock timing by providing a method of ensuring that the CDPD DSP reads the right number of samples from the FIFO buffer.

Figure 5:
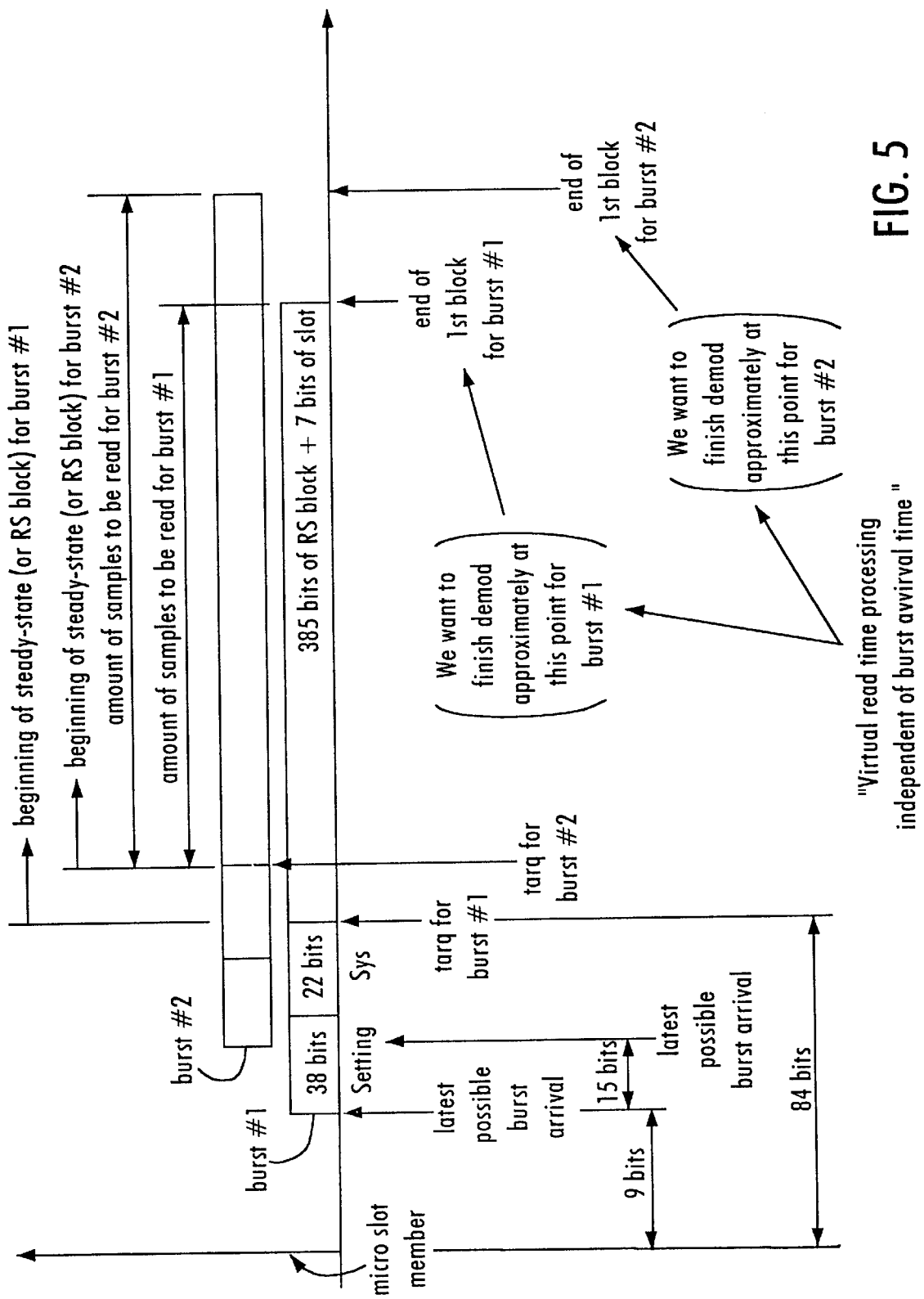
FIG. 5 is diagram of CDPD bursts capable of being received in accordance with the present invention.

Some of the important consideration in properly sampling the CDPD IQ pairs include acquisition and processing delays. In general, signal demodulation involves acquiring the signal/burst, then demodulating the so-called steady state portion of the burst. As shown in FIG. 5, microslot markers separated by approximately 3.125 microseconds mark the beginning of the burst arrival window. The acquisition process involves detecting the burst, then estimating certain parameters such as burst arrival time and carrier frequency offset. Because the burst can arrive anywhere within an approximately 14 bit search window, and because the frequency offset can be in a range from plus or minus 3 KHz, there can be considerable acquisition delay. In the present example, the acquisition delay can be up to 20 CDPD clock pulses.

Referring again to FIG. 5, the CDPD burst message has a preamble formed by a dotting sequence of 38 bits followed by a synchronization pattern of 22 bits. Following the preamble is a data sequence that may have up to 64 blocks of 385 data bits. Thus, because of arrival time and frequency offset delays, after the synchronization pattern 20 additional bits may have been received. However, to properly read the samples, there must be negligible delay at the last sample in the data sequence. Thus, in cases where delay is present, the so-called "steady state" demodulation should proceed faster than the real time CDPD IQ sample arrival. The present invention properly connects acquisition and steady state demodulation together to achieve this timing, and also avoid overflowing the FIFO memory and FIFO buffer.

The method of the present invention is directed toward achieving virtual real time processing independent of burst arrival time. This means that demodulation of each CDPD data message should be timed to finish at approximately the end of the data message. At the end of an RS block demodulation, the total number of FIFO samples which the DSP read dictates the approximate time elapsed from the microslot marker. Thus, virtual real time processing independent of burst arrival time can by achieved by adjusting the total number of FIFO samples to be read during steady state demodulation.

The burst arrival time, $t_{acq}$, represents the starting point of the steady state block and/or the end of the synchronization pattern. The $t_{acq}$ value is measured in bits from the preceding microslot. Thus, for the examples shown in FIG. 5, burst #2 has a $t_{acq}$=84, and burst #1 has a $t_{acq}$=69. For bursts that arrived earlier than burst #2, the DSP should read fewer samples ($N_s$) than burst #2 in the steady state to achieve virtual real time processing. $N_s$ is determined by the following equation, $$N_s = [84 - t_{acq}] \times (24300/19200) \times 8$$
$$= (84 - t_{acq}) \times 10$$

The FIFO reading method of the present invention is particularly suited to demodulating RS (Reed-Solomon) encoded symbols in RS blocks. One RS block contains 63 RS symbols. There are CDPD 6 bits per RS symbol, thus the number of bits per RS block is 378 plus 7 continuity indicator bits, totalling 385. The 385 RS bits equal 3898.125 (385×8×(24300/19200)) FIFO samples.

The method of the present invention reads a fixed amount of samples from the FIFO buffer at each RS symbol boundary. In the preferred embodiment, 60 FIFO samples are read at the beginning of each RS symbol. Thus, the total number of samples to be read per block is 60×63=3780, leaving 118. Thus, at the beginning of the first RS block, 118 additional FIFO samples are read. 118 FIFO samples equal about 11 CDPD bits. Because acquisition introduces usually more than 10 bits of delay, those samples are already available in the FIFO buffer. The number of FIFO samples required per block is 3898.125. Thus, for each block, 0.125 additional FIFO samples are necessary, or for 64 blocks, 0.125×64=8 additional FIFO samples are necessary. This can be compensated for by reading 8 more FIFO samples in the beginning of the first block.

Thus, the FIFO reading strategy of the present invention proceeds according to the following modification of the number of FIFO samples reads for the first block, $$118+60-(84-t_{acq})\times 10=t_{acq}\times 10-662$$

In the above formula, $t_{acq}$ is the burst arrival time estimation in bits, 10 is approximation of 8×81/64=10.125.

By following the FIFO reading strategy of the present invention, garbage samples are not read from the FIFO buffer because the demodulation speed is limited by the number of FIFO samples read. Overhead processing time in reading the FIFO can be reduced by skipping "FIFO empty flag checks" for most of the FIFO read cycles. For example, Table 1 below compares the FIFO reading instruction cycles of the TI C51 family DSPs.

TABLE 1

| | Without flag check | With flag check |
|---|---|---|
| FIFO read cycles for TI C51 family DSP | | |
| Number of cycles | 4 | 11 (minimum) |
| FIFO buffer external | | |
| Number of cycles | 7 | 17 (minimum) |

If the FIFO buffer is implemented external to the DSP, and if the FIFO empty flag is checked, reading two antenna samples per bit consumes 17×20=340 instruction cycles. With 960 instruction cycles available per bit, 35.4% of processing power would be dedicated to reading FIFO only.

Figure 6:
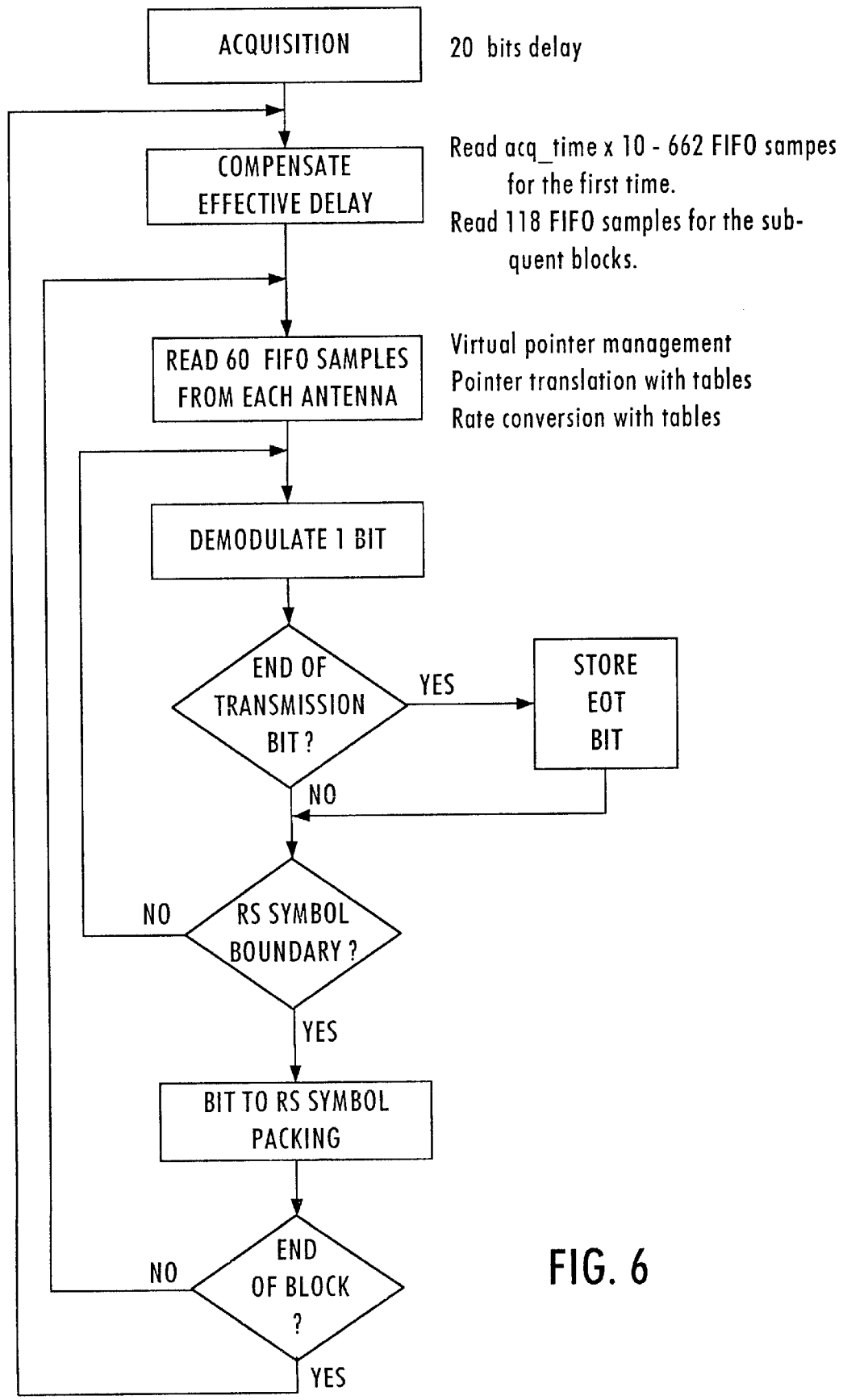
FIG. 6 is a flow diagram illustrating CDPD demodulation and data flow in accordance with the present invention.

FIG. 6 is a block diagram illustrating how the virtual CDPD buffer, rate translation, and virtual real time processing methods of the present invention may be incorporated into the demodulation protocol of the DSP 28. The virtual real time processing is performed after "Acquisition" in the "Compensate Effective Delay" operation. This occurs for each block. The virtual pointer management, pointer translation with tables, and rate conversion with tables occurs during the "Read 60 Samples From Each Antenna" operation. This is done after every 60 samples in the block.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A method of converting serial in-phase (I) symbols and quadrature-phase (Q) symbols at a first sampling rate to time-aligned IQ pairs at a second sampling rate, the steps comprising:

generating a serial stream of alternating I symbols and Q symbols at said first sampling rate;

storing said serial stream of I and Q symbols in a buffer;

translating said serial stream of alternating I and Q symbols into time-aligned IQ pairs at said second sampling rate, said translating step further comprising the substeps of:

determining a first serial I symbol;

determining a second serial I symbol determining an I component of said IQ pair at said second sampling rate by interpolating between said first serial I symbol and said second serial I symbol;

determining a first serial Q symbol;

determining a second serial Q symbol; and determining a Q component of said IQ pair at said second sampling rate by interpolating between said first serial Q symbol and said second serial Q symbol;

said I component being time-aligned with said Q component to form said time-aligned IQ pair at said second sampling rate; and reading said time-aligned IQ pairs into a digital signal processor for demodulation.

* * * * *